Figures 1, 2:
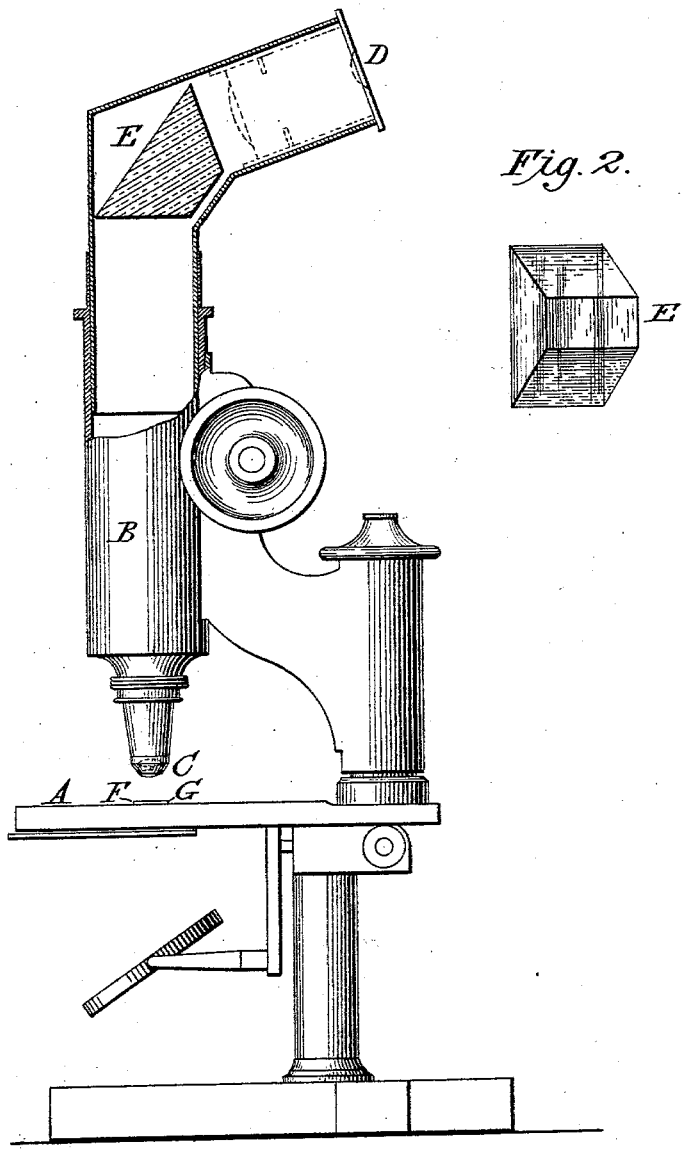

No. 745,584. PATENTED DEC. 1, 1903.
A. F. EDNEY.
MICROSCOPE.
APPLICATION FILED MAR. 5, 1903.
NO MODEL. 2 SHEETS—SHEET 1.

No. 745,584. PATENTED DEC. 1, 1903.
A. F. EDNEY.
MICROSCOPE.
APPLICATION FILED MAR. 5, 1903.
NO MODEL. 2 SHEETS—SHEET 2.
Fig. 3. Fig. 4.
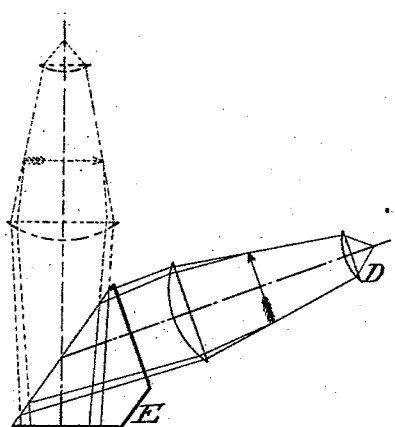
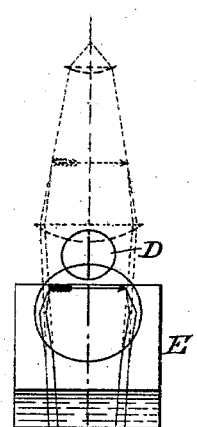
Fig. 5.
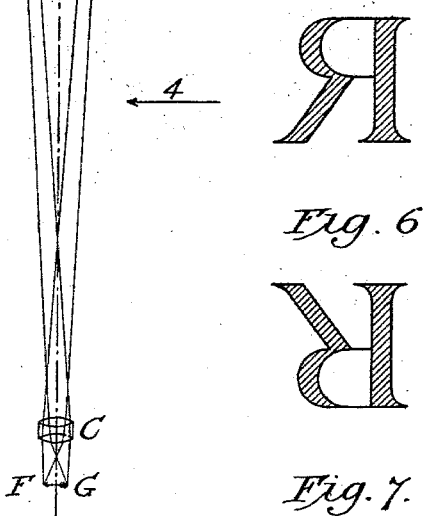
Fig. 6.
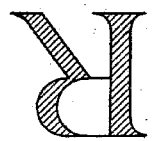
Fig. 7.
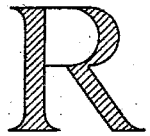

No. 745,584.

Patented December 1, 1903.

UNITED STATES PATENT OFFICE.

ARTHUR FREDERICK EDNEY, OF BROOKLYN, NEW YORK, ASSIGNOR TO THE MERGENTHALER LINOTYPE COMPANY, A CORPORATION OF NEW YORK.

MICROSCOPE.

SPECIFICATION forming part of Letters Patent No. 745,584, dated December 1, 1903.

Application filed March 5, 1903. Serial No. 146,386. (No model.)

*To all whom it may concern:*

Be it known that I, ARTHUR FREDERICK EDNEY, a subject of the King of Great Britain, residing at Brooklyn, county of Kings, and State of New York, have invented a new and useful Improvement in Microscopes, of which the following is a specification.

My invention has reference to microscopes which are used more particularly in the study and measurement of printers' type from which large drawings are to be made for use in type-punches or similar purposes.

A printer's type instead of having its letter faced to the right in the direction in which the line is read has the character faced to the left. In studying the form and proportion of the lines, and particularly the curved lines, it is highly desirable that the image presented to the eye of the operator shall be the natural or true image of the character as it appears in print—in other words, that the letter should be faced to the right instead of the left.

The aim of my invention is to so construct the instrument that it will reverse the image of the letter from left to right or from side to side and at the same time present it in the upright or natural position. To this end I arrange the eyepiece and its lenses with their focal axes at an angle to the axis of the objective and introduce at an intermediate point a prism. The effect of this arrangement is to reverse the image from left to right without inverting it, so that if the type is placed in the field of the objective in its natural or upright position it will appear to the eye of the observer in an erect position, but with its face reversed, so that it presents the same appearance as the printed character.

Figure 1 is an elevation of a microscope provided with my improvement, the eyepiece being represented in section. Fig. 2 is a perspective view of the prism. Fig. 3 is a diagram illustrating the relation of the lenses and the prism, the course of the rays, and the position of the type or other object, as well as the position of the image. This view also indicates in dotted lines the arrangement and action of the ordinary istrument. Fig. 4 is a diagram looking in the direction indicated by the arrow 4 in Fig. 3. Fig. 5 represents a type-face as it appears to the naked eye; Fig. 6, the appearance which it presents when viewed through an ordinary microscope; Fig. 7, the appearance which it presents when viewed through my instrument.

Referring to the drawings, A represents the stage or platform in which the type or other object is supported; B, the vertical tube or body of the instrument, provided with the ordinary objective C.

D represents the eyepiece, having its upper portion with the lenses therein arranged at an angle to the axis of the objective. The lower vertical end of the eyepiece is arranged to enter the upper portion of the body, as usual. In the angle of the eyepiece or tube I mount a prism E of the form shown having a single reflecting-surface.

F G represent the type or other object in the field of the objective, its top being at F. The course of the rays is indicated by the full lines in Fig. 3. It will be seen that the image is reversed by the prism from left to right and also presented in an erect or natural position. The change effected by the introduction of the prism and the angular arrangement of the eyepiece will be perceived by reference to the dotted lines in Figs. 3 and 4, which represent the course of the rays in an ordinary instrument. It will be seen by reference to the arrows representing the image that in the old instrument it was reversed in both directions, so that if faced to the right in the natural position it was also inverted.

I believe my instrument to be the first in which a left-handed character can be reversed, so as to present a right-handed image in its natural upright position.

It will be observed that in my instrument the plane of the reflecting-surface of the prism faces the observer. The rays from the object cross each other, as indicated in Figs. 3 and 4, before they reach the prism, which simply alters their course without changing their relative positions, and they form an image on the prism which is reversed from left to right as compared with the object.

The angular arrangement of the eyepiece is also advantageous in that it permits the objective to be arranged in a vertical position, so as to permit the most advantageous lighting of the object, while at the same time the operator looking laterally into the instrument is enabled to do so for long periods of time without assuming any unnatural or tiresome position.

Having described my invention, what I claim is—

1. A microscope for use in reproducing type, having its objective and its eyepiece arranged with their axes in angular relations, in combination with the prism located at the intersection of said axes, in the position described and shown, whereby the image is reversed from right to left without being inverted.

2. In a microscope, the body portion B, carrying the objective, the tube having its lower end adapted to enter the body and its upper end extended laterally, in combination with the prism E, mounted in the middle of the tube, and the eyepiece D, mounted in its upper end.

3. In a microscope and in combination with the body B, containing the objective, the angular tubular portion having an eyepiece D and a prism E fixed therein, its lower portion being adjustably connected with the body, whereby the relations between the eyepiece and prism are maintained, notwithstanding their adjustment in relation to the objective.

In testimony whereof I hereunto set my hand, this 16th day of February, 1903, in the presence of two attesting witnesses.

ARTHUR FREDERICK EDNEY.

Witnesses:
  WALTER STODDART,
  LOUIS RHOME.